(12) United States Patent
Bian (10) Patent No.: US 12,339,495 B2
(45) Date of Patent: Jun. 24, 2025

(54) GRATINGS WITH NON-RECTANGULAR SEGMENTS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 450 days.

(21) Appl. No.: 17/861,345

(22) Filed: Jul. 11, 2022

(65) Prior Publication Data

US 2024/0012200 A1 Jan. 11, 2024

(51) Int. Cl.
*G02B 6/124* (2006.01)
*G02B 6/12* (2006.01)
*G02B 6/122* (2006.01)
*G02B 6/13* (2006.01)

(52) U.S. Cl.
CPC ........... *G02B 6/124* (2013.01); *G02B 6/1228* (2013.01); *G02B 6/13* (2013.01); *G02B 2006/12097* (2013.01); *G02B 2006/12107* (2013.01); *G02B 2006/12121* (2013.01)

(58) Field of Classification Search
CPC ......... G02B 6/124; G02B 6/1228; G02B 6/13
See application file for complete search history.

(56) References Cited

U.S. PATENT DOCUMENTS

| 10,816,726 | B1 | 10/2020 | Peng et al. |
| 11,378,743 | B1 * | 7/2022 | Bian ...................... G02B 6/305 |
| 2021/0278611 | A1 | 9/2021 | Sahin et al. |
| 2022/0043207 | A1 | 2/2022 | Bian |

OTHER PUBLICATIONS

José Manuel Luque-González et al., "Designing polarization management devices by tilting subwavelength grating", Proc. SPIE 11031, Integrated Optics: Design, Devices, Systems, and Applications V, 110310M (Apr. 26, 2019); https://doi.org/10.1117/12.2522050.
José Manuel Luque-González et al., "Tilted subwavelength gratings: controlling anisotropy in metamaterial nanophotonic waveguides," Optics Letter 43, 4691-4694 (2018).

(Continued)

*Primary Examiner* — Michael P Mooney
(74) *Attorney, Agent, or Firm* — Thompson Hine LLP; Anthony Canale (57) ABSTRACT

Structures for a grating that may be deployed in edge coupler and methods of forming such structures. The structure comprises a waveguide core positioned on a substrate. The waveguide core includes a longitudinal axis and a grating having first and second segments positioned along the longitudinal axis in a spaced-apart arrangement. The first segment has a first sidewall sloped at a first angle relative to the longitudinal axis and a second sidewall oriented transverse to the longitudinal axis. The second segment has a first sidewall sloped at a second angle relative to the longitudinal axis and a second sidewall oriented transverse to the longitudinal axis. The first sidewall of the first segment positioned adjacent to the first sidewall of the second segment.

20 Claims, 6 Drawing Sheets

(56) References Cited

OTHER PUBLICATIONS

E. El-Fiky et al., "Ultra-Broadband and Compact Asymmetrical Beam Splitter Enabled by Angled Sub-Wavelength Grating MMI," 2018 Conference on Lasers and Electro-Optics (CLEO), 2018, pp. 1-2.

Shanghai Infocrops Science & Technology Co., Limited, "Parametric Optimization and Tolerance Analysis of Slanted Gratings," LightTrans, pp. 1-10 (Jun. 2019).

Elnaz Akbari et al., "Quality factor investigation by using trapezoidal subwavelength grating waveguide micro-ring resonator based on graphene," Results in Physics, vol. 10, 2018, pp. 304-307, ISSN 2211-3797, https://doi.org/10.1016/j.rinp.2018.06.002.

Zheng Wang, Xiaochuan Xu, Donglei Fan, Yaguo Wang, and Ray T. Chen, "High quality factor subwavelength grating waveguide micro-ring resonator based on trapezoidal silicon pillars," Opt. Lett. 41, 3375-3378 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC), OSA Technical Digest (Optica Publishing Group, 2020), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," 2021 Optical Fiber Communications Conference and Exhibition (OFC), pp. 1-3, M5A.2 (2021).

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

Y. Bian et al., "Integrated Laser Attach Technology on a Monolithic Silicon Photonics Platform," 2021 IEEE 71st Electronic Components and Technology Conference (ECTC), 2021, pp. 237-244, doi: 10.1109/ECTC32696.2021.00048.

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th31.4 (2020).

Y. Bian et al., "Monolithically integrated silicon nitride platform," 2021 Optical Fiber Communications Conference and Exhibition (OFC), pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Dezfulian, Kevin K. et al., "Hybrid Edge Couplers With Layers in Multiple Levels" filed on Feb. 8, 2021 as a U.S. Appl. No. 17/169,971.

Bian, Yusheng, "Edge Couplers With Metamaterial Rib Features" filed on Jul. 7, 2021 as a U.S. Appl. No. 17/369,253.

Bian, Yusheng et al., "Spot-Size Converters With Angled Facets" filed on Feb. 24, 2022 as a U.S. Appl. No. 17/679,188.

Bian, Yusheng, "Edge Couplers With a High-Elevation Assistance Feature" filed on Jun. 29, 2022 as a U.S. Appl. No. 17/853,186.

* cited by examiner

GRATINGS WITH NON-RECTANGULAR SEGMENTS

BACKGROUND

The disclosure relates to photonics chips and, more specifically, to structures for a grating that may be deployed in an edge coupler and methods of forming such structures.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

An edge coupler, also known as a spot-size converter, is an optical component that is commonly used for coupling light of a given mode from a light source, such as a laser or an optical fiber, to other optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Improved structures for a grating that may be deployed in an edge coupler and methods of forming such structures are needed.

SUMMARY

In an embodiment of the invention, a structure comprises a waveguide core positioned on a substrate. The waveguide core includes a longitudinal axis and a grating having first and second segments positioned along the longitudinal axis in a spaced-apart arrangement. The first segment has a first sidewall sloped at a first angle relative to the longitudinal axis and a second sidewall oriented transverse to the longitudinal axis. The second segment has a first sidewall sloped at a second angle relative to the longitudinal axis and a second sidewall oriented transverse to the longitudinal axis. The first sidewall of the first segment positioned adjacent to the first sidewall of the second segment.

In an embodiment of the invention, a method comprises forming a waveguide core that has a longitudinal axis and a grating including first and second segments positioned along the longitudinal axis in a spaced-apart arrangement. The waveguide core is positioned on a substrate, the first segment has a first sidewall sloped at a first angle relative to the longitudinal axis and a second sidewall oriented transverse to the longitudinal axis, the second segment has a first sidewall sloped at a second angle relative to the longitudinal axis and a second sidewall oriented transverse to the longitudinal axis, and the first sidewall of the first segment is positioned adjacent to the first sidewall of the second segment.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

With reference to FIGS. 1-4 and in accordance with embodiments of the invention, a structure 10 for an edge coupler includes a waveguide core 12 that is positioned on a dielectric layer 14 and a substrate 16 positioned below the dielectric layer 14. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, one or more additional dielectric layers comprised of a dielectric material, such as silicon dioxide, may be positioned between the dielectric layer 14 and the waveguide core 12.

The waveguide core 12 may include segments 18, 20, 22, segments 24, a rib 25 that overlaps with the segments 24, and a section 26 that is positioned adjacent to the segments 24 and rib 25. The segments 18, 20, 22, the rib 25 and segments 24, and the section 26 may be arranged along a longitudinal axis 13 of the waveguide core 12. The segments 18, 20, 22 define a grating 27 in which the segment 20 is longitudinally positioned between the segment 22 and the segments 18. In an embodiment, the segments 18, 20, 22 of the grating 27 may be centered on the longitudinal axis 13. In an embodiment, the grating 27 may be terminated at one end by one of the segments 18. Adjacent pairs of the segments 18, 20, 22 are separated by gaps 28 having a given dimension in a direction along the longitudinal axis 13. Adjacent pairs of the segments 24 are also separated by gaps defined at the opposite side edges of the rib 25 and having a given dimension in a direction along the longitudinal axis 13. In an embodiment, the width dimension of the rib 25 may increase with increasing distance from the segments 18, 20, 22. The waveguide core 12 may be located on a photonics chip, and the section 26 of the waveguide core 12 may be connected to other optical components formed on the photonics chip.

Figure 1:
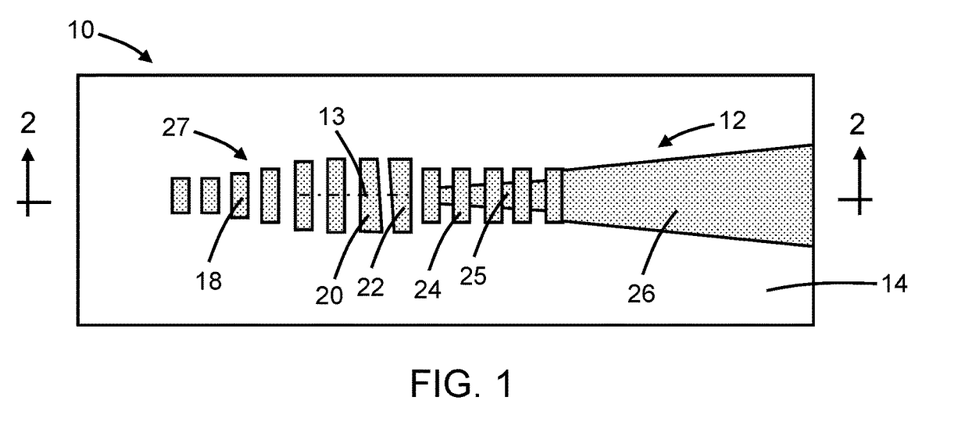
FIG. 1 is a top view of a structure at an initial fabrication stage of a processing method in accordance with embodiments of the invention.
Figure 2:
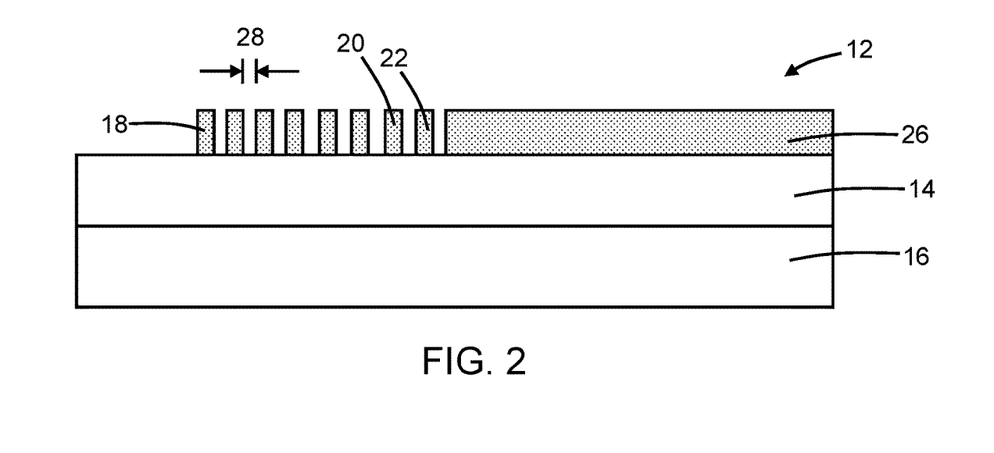
FIG. 2 is a cross-sectional view taken generally along line 2-2 in FIG. 1.
Figure 3:
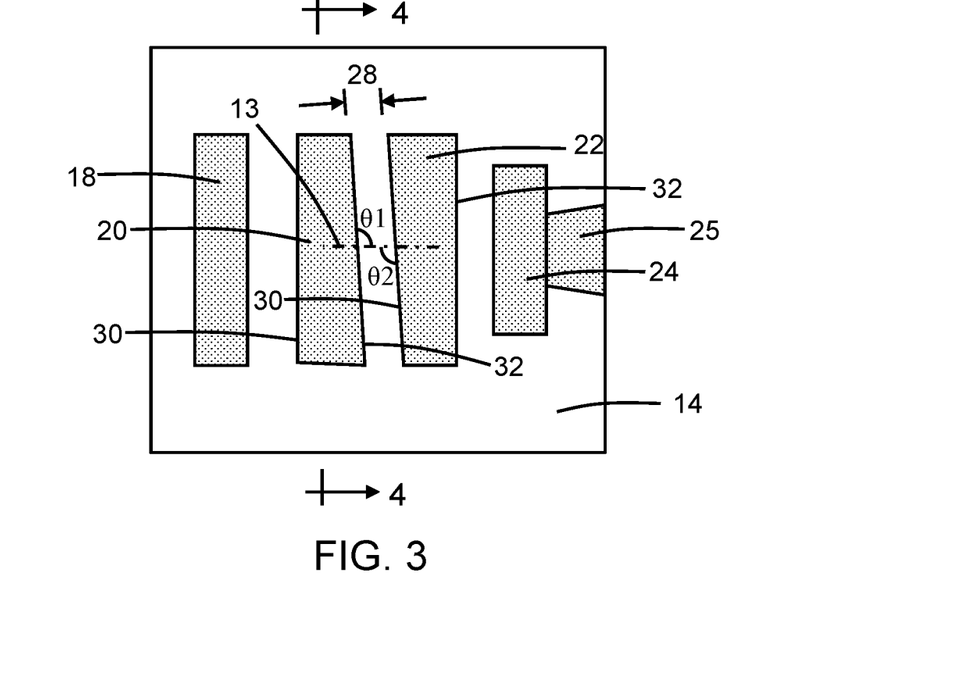
FIG. 3 is an enlarged view of a portion of FIG. 1.
Figure 4:
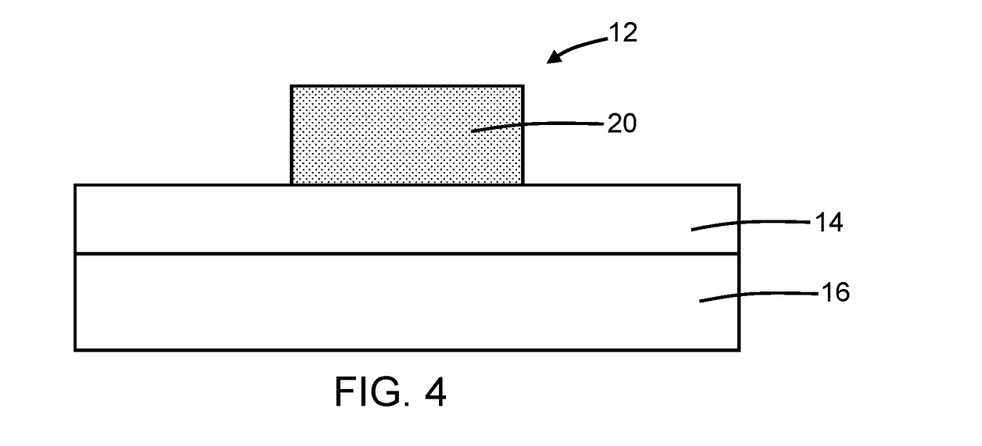
FIG. 4 is a cross-sectional view taken generally along line 4-4 in FIG. 3.

In an embodiment, the pitch and duty cycle of the segments 18, 20, 22 and the pitch and duty cycle of the segments 24 may be uniform to define periodic arrangements. In alternative embodiments, the pitch and/or the duty cycle of the segments 18, 20, 22 and the pitch and/or duty cycle of the segments 24 may be apodized (i.e., non-uniform) to define non-periodic arrangements. The segments 18, 20, 22 and the segments 24 of the grating 27 may be dimensioned and positioned at small enough pitch so as to define a sub-wavelength grating that does not radiate or reflect light at a wavelength of operation, such as a wavelength in a range of 400 nm to 3000 nm.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon or polysilicon. In an alternative embodiment, the waveguide core 12 may be comprised of a dielectric material, such as silicon nitride. In an alternative embodiment, the waveguide core 12 may be comprised of silicon oxynitride. In alternative embodiments, other materials, such as a polymer or a III-V compound semiconductor, may be used to form the waveguide core 12.

In an embodiment, the waveguide core 12 may be formed by patterning a layer of material with lithography and etching processes. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer of a material (e.g., silicon nitride).

The segments 18, 20, 22 of the grating 27 have opposite sidewalls 30, 32 that border the gaps 28. Each gap 28 is positioned between one of the sidewalls 30 and one of the sidewalls 32. The segment 20 and the segment 22 have a different geometrical shape than the segments 18. The sidewalls 30, 32 of the segments 18 may be oriented parallel to each other and transverse to the longitudinal axis 13. The sidewall 32 of the segment 20 is oriented non-parallel to the sidewall 30 of the segment 20, and the sidewall 30 of the segment 22 is oriented non-parallel to the sidewall 32 of the segment, which results in non-rectangular shapes for the segments 20, 22 from a perspective in a vertical direction.

In the representative embodiment, the segment 20 is positioned in the grating 27 adjacent to the segment 22 in a spaced-apart arrangement. In particular, the sidewall 32 of the segment 20 is positioned adjacent to, and spaced across the gap 28 from, the sidewall 30 of the segment 22. The sidewall 32 of the segment 20 is sloped at an angle θ1 relative to the longitudinal axis 13, and the sidewall 30 of the segment 22 is sloped at an angle θ2 relative to the longitudinal axis 13. The angle θ1 and the angle θ2 are not right angles. In an embodiment, the angle θ1 and the angle θ2 may be obtuse angles. In an embodiment, the angle θ1 and the angle θ2 may be equal. In an embodiment, the gap 28 between the sidewall 30 of segment 22 and the sidewall 32 of segment 20 may be uniform in width. In an embodiment, the sidewall 32 of the segment 20 and the sidewall 30 of the segment 22 may be sloped parallel to each other. The sidewall 30 of the segment 20 and the sidewall 32 of the segment 22 may be oriented parallel to each other and transverse to the longitudinal axis 13. As a result, the sidewall 30 of the segment and the sidewall 32 of the segment 22 are oriented at right angles relative to the longitudinal axis 13.

Figure 5:
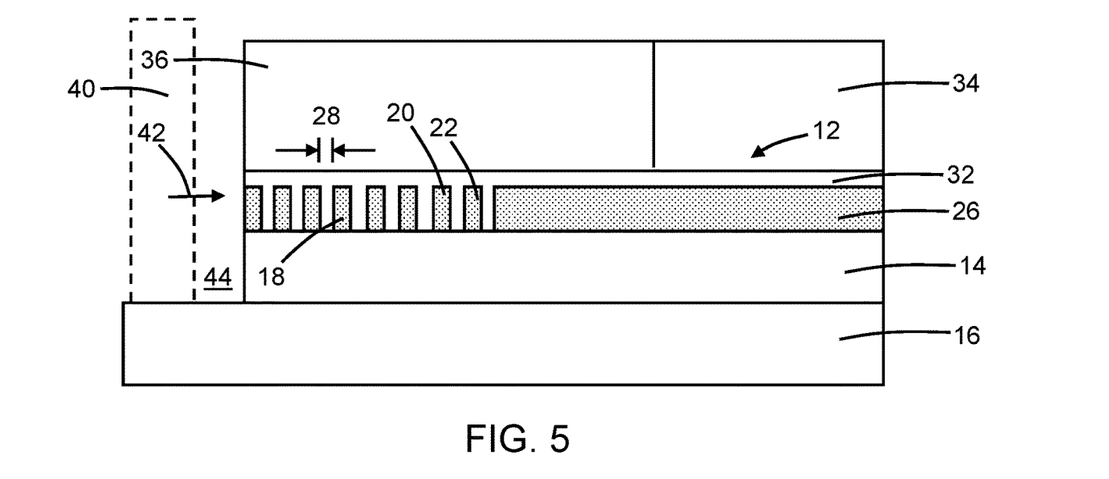
FIG. 5 is a cross-sectional view of the structure at a fabrication stage of the processing method subsequent to FIG. 2.

With reference to FIG. 5 in which like reference numerals refer to like features in FIGS. 1-4 and at a subsequent fabrication stage, a dielectric layer 34 is formed over the waveguide core 12. The dielectric layer 34 may be comprised of a dielectric material, such as silicon dioxide, that is deposited and then planarized following deposition. In an embodiment, the waveguide core 12 may be embedded in the dielectric layer 34, which may be thicker than the waveguide core 12. The dielectric material constituting the dielectric layer 34 may have a refractive index that is less than the refractive index of the material constituting the waveguide core 12.

The dielectric layer 34 is disposed in the gaps between adjacent pairs of the segments 18, 20, 22 in the grating 27. In an embodiment, the dielectric material of the dielectric layer 34 may fully fill the gaps. The segments 18, 20, 22 and the dielectric material of the dielectric layer 34 in the gaps between adjacent segment pairs may define a metamaterial structure in which the material constituting the segments 18, 20, 22 has a higher refractive index than the dielectric material of the dielectric layer 34. The metamaterial structure can be treated as a homogeneous material having an effective refractive index that is intermediate between the refractive index of the material constituting the segments 18, 20, 22 and the refractive index of the dielectric material of the dielectric layer 34.

A back-end-of-line stack 36 may be formed over the dielectric layer 34. The back-end-of-line stack 36 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide. The back-end-of-line stack 36 may be removed from above the segments 18, 20, 22, segments 24, and rib 25, and replaced by a dielectric layer 38 comprised of a homogeneous dielectric material, such as silicon dioxide.

A light source 40 may provide light (e.g., laser light) in a mode propagation direction 42 toward an edge coupler including the waveguide core 12. The edge coupler may be positioned at an edge of a photonics chip and configured for coupling light from the light source 40 to optical components on the photonics chip. The light may have a given wavelength, intensity, mode shape, and mode size, and the edge coupler may provide spot size conversion for the light. The space between the edge coupler and the light source 40 may be filled by air or by an index-matching material, such as an adhesive. The light source 40 may be positioned in a cavity 44 formed in the substrate 16 and dielectric layers 34, 38. In an embodiment, the light source 40 may be a semiconductor laser diode positioned adjacent to the segments 18 of the waveguide core 12, and the semiconductor laser diode may be attached inside the cavity 44. In an alternative embodiment, the light source 40 may be a semiconductor optical amplifier positioned adjacent to the segments 18 of the waveguide core 12. In an alternative embodiment, the light source 40 may be a single-mode or multi-mode optical fiber that is positioned in the cavity 44 adjacent to the edge coupler. In an alternative embodiment, the cavity 44 may extend as an undercut in the substrate 16 beneath the edge coupler.

The incorporation of the non-rectangular segments 20, 22 into the grating 27 may be effective to reduce the optical return loss. In particular, the incorporation of the non-rectangular segments 20, 22 into the grating 27 may be effective to reduce the optical return loss in the transition region from the grating 27 to the fishbone section including the segments 24 and rib 25. Light reflected from the sidewall 32 of the segment 20 and the sidewall 30 of the segment 22 is redirected in a direction that is non-aligned with the longitudinal axis 13 and, therefore, not redirected back toward the light source 40, which contributes to the reduction in the optical return loss. The sidewall 30 of the segment 20 and the sidewall 32 of the segment 22 promote transmission of the light from the light source 40 to the segments 24 and rib 25.

In alternative embodiments, the grating 27 including the segments 20, 22 may be incorporated into an optical component different than an edge coupler.

Figure 6:
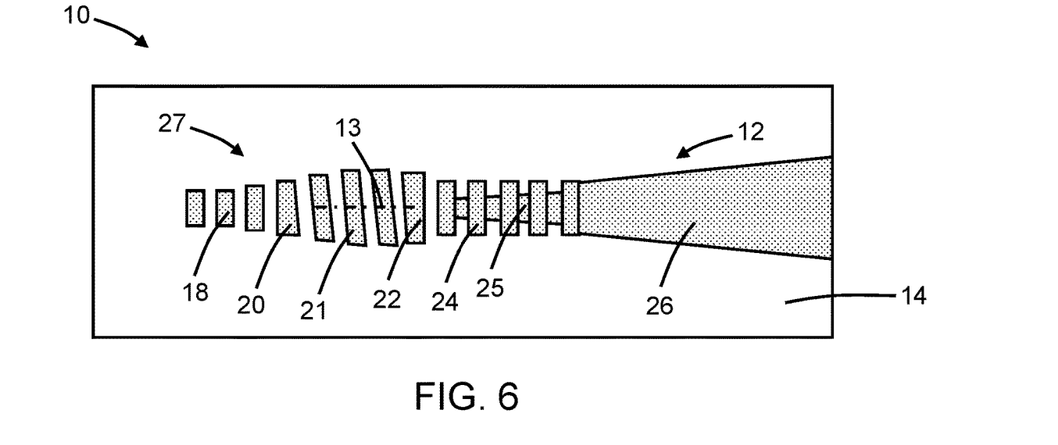
FIG. 6 is a top view of a structure in accordance with alternative embodiments of the invention.
Figure 7:
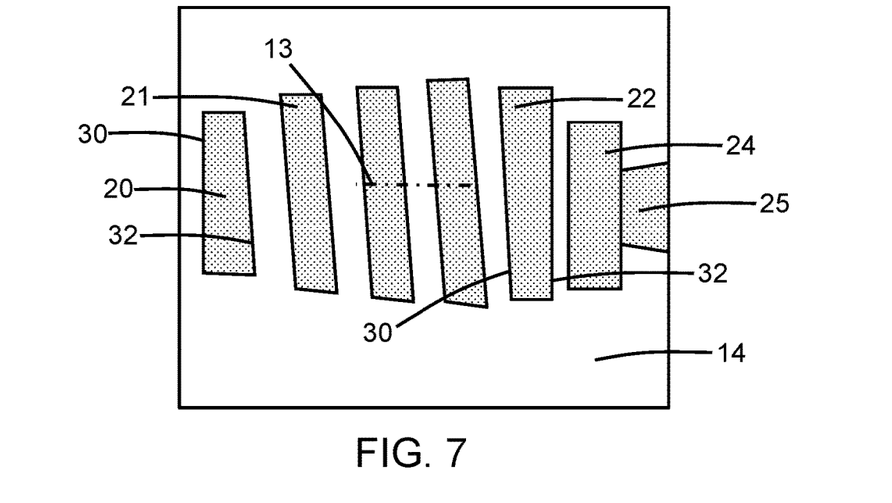
FIG. 7 is an enlarged view of a portion of FIG. 6.

With reference to FIGS. 6, 7 and in accordance with alternative embodiments of the invention, the segment 20 may be spaced along the longitudinal axis 13 from the segment 22, and segments 21 may be longitudinally positioned between the sidewall 32 of the segment 20 and the sidewall 30 of the segment 22. In an embodiment, one or both of the sidewalls 30, 32 of each segment 21 may be oriented at an angle relative to the longitudinal axis 13. In an embodiment, the sidewalls 30, 32 of each segment 21 may be oriented at either the angle θ1 and the angle θ2.

Figure 8:
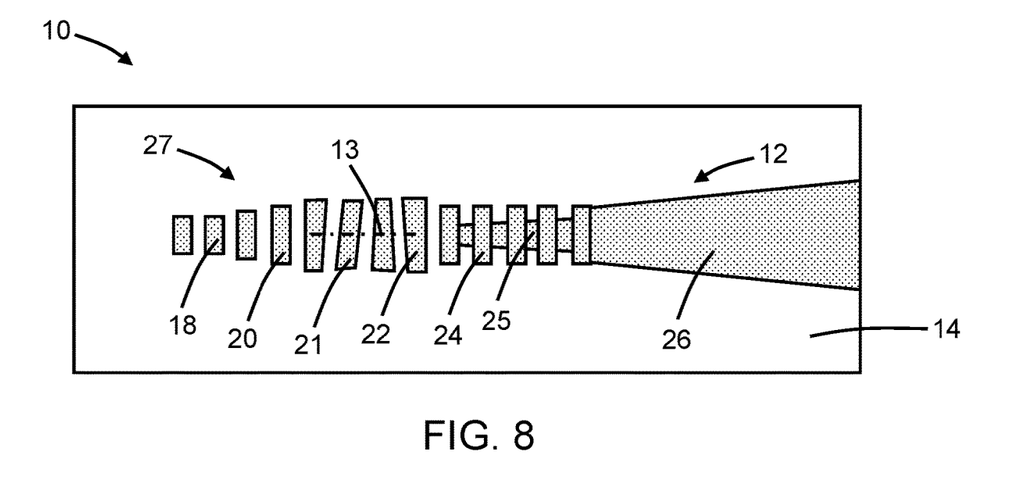
FIG. 8 is a top view of a structure in accordance with alternative embodiments of the invention.
Figure 9:
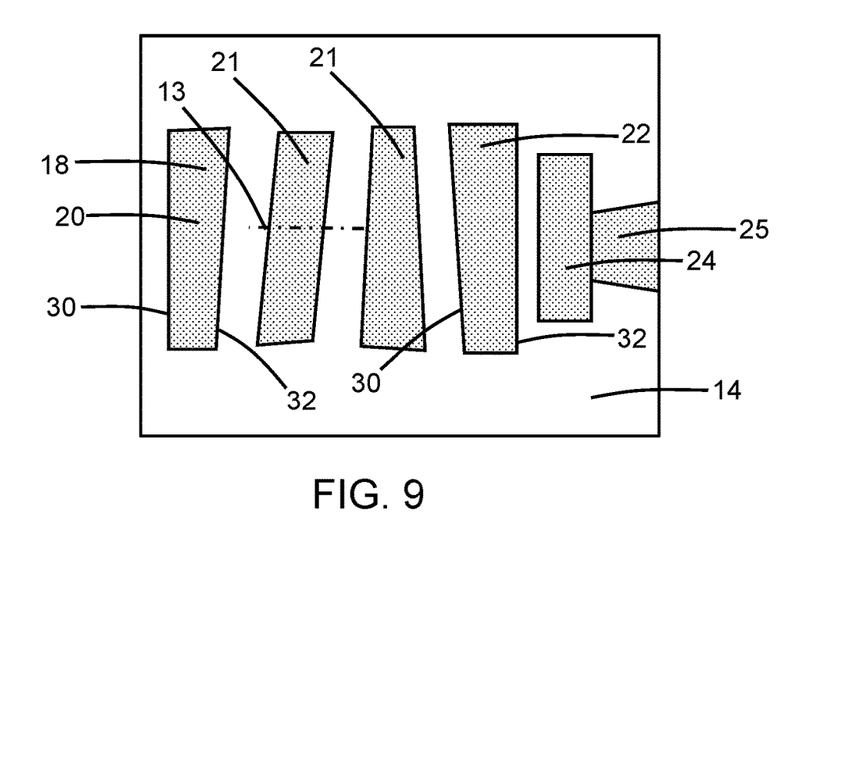
FIG. 9 is an enlarged view of a portion of FIG. 8.

With reference to FIGS. 8, 9 and in accordance with alternative embodiments of the invention, the segments 21 may have sidewalls 30, 32 that are not oriented relative to the longitudinal axis 13 at either the angle θ1 or the angle θ2.

Figure 10:
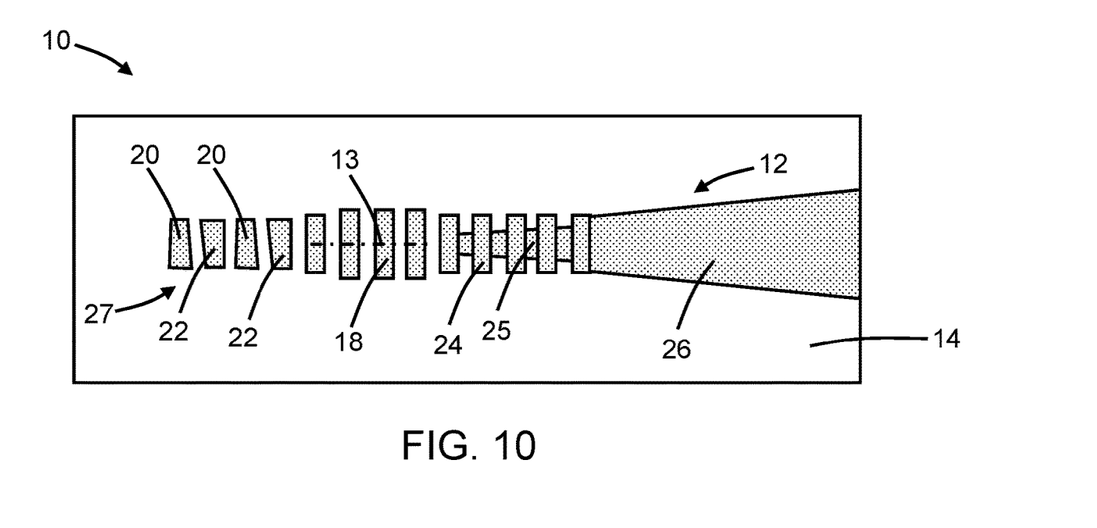
FIG. 10 is a top view of a structure in accordance with alternative embodiments of the invention.

With reference to FIG. 10 and in accordance with alternative embodiments of the invention, the segments 20, 22 may be grouped as a unit, and two or more units of the segments 20, 22 may be replicated and arranged along the longitudinal axis 13. In the representative embodiment, a pair of units of the segments 20, 22 is provided, and the segments 18 are longitudinally positioned in the grating 27 between the pair of units of the segments 20, 22 and the segments 24 and rib 25. In an embodiment, the grating 27 may be terminated adjacent to the light source 40 (FIG. 5) by the segment 20 of one of the units.

Figure 11:
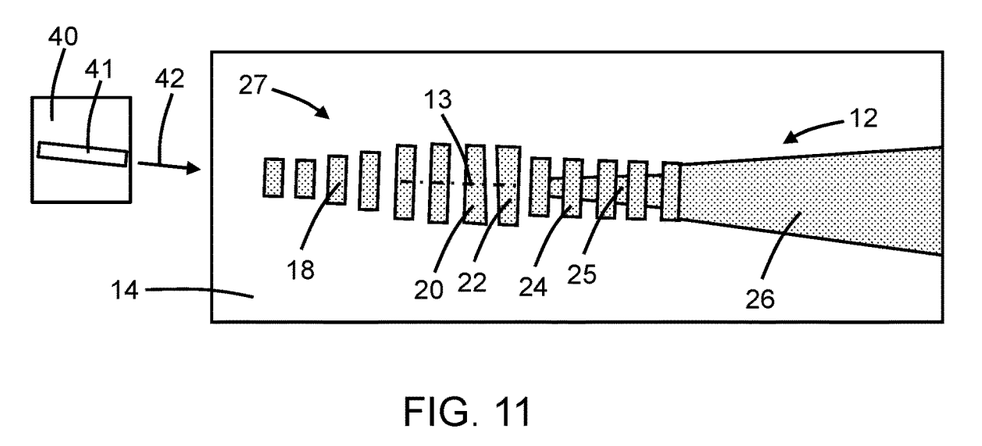
FIG. 11 is a top view of a structure in accordance with alternative embodiments of the invention.

With reference to FIG. 11 and in accordance with alternative embodiments of the invention, the light source 40 may be a semiconductor laser with a light-emitting layer 41 that is rotated and tilted such that the mode propagation direction 42 is also tilted or rotated. The waveguide core 12 may be rotated or tilted such that the longitudinal axis 13 is parallel or substantially parallel to the mode propagation direction 42 in order to match the tilting of the light-emitting layer 41.

Figure 12:
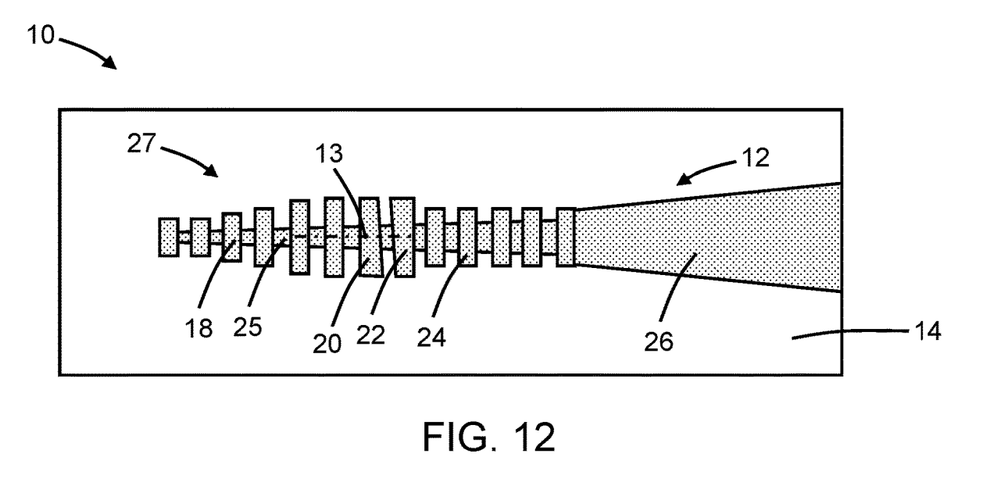
FIG. 12 is a top view of a structure in accordance with alternative embodiments of the invention.

With reference to FIG. 12 and in accordance with alternative embodiments of the invention, the rib 25 may be extended in length to overlap with the segments 18, 20, 22 of the grating 27. In an embodiment, the rib 25 may overlap with all of the segments 18, 20, 22 of the grating 27, as well as overlapping with the segments 24.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/− 10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a substrate; and
a waveguide core positioned on the substrate, the waveguide core including a longitudinal axis and a grating, the grating including a first segment and a second segment positioned along the longitudinal axis in a first spaced-apart arrangement, the first segment having a first sidewall sloped at a first angle relative to the longitudinal axis and a second sidewall oriented transverse to the longitudinal axis, the second segment having a first sidewall sloped at a second angle relative to the longitudinal axis and a second sidewall oriented transverse to the longitudinal axis, and the first sidewall of the first segment positioned adjacent to the first sidewall of the second segment.

2. The structure of claim 1 wherein the first sidewall of the first segment and the first sidewall of the second segment are separated by a gap, and the waveguide core further includes a dielectric material disposed in that fills the gap.

3. The structure of claim 2 wherein the first angle is equal to the second angle such that the gap has a uniform width.

4. The structure of claim 1 further comprising:
a light source positioned adjacent to the waveguide core, the light source configured to provide light in a mode propagation direction toward the waveguide core,
wherein the first segment is positioned along the longitudinal axis between the second segment and the light source.

5. The structure of claim 4 wherein the second sidewall of the first segment is positioned closer to the light source along the longitudinal axis than the first sidewall of the first segment.

6. The structure of claim 4 wherein the first sidewall of the second segment is positioned closer to the light source along the longitudinal axis than the second sidewall of the second segment.

7. The structure of claim 4 wherein the light source is an optical fiber.

8. The structure of claim 4 wherein the light source is a semiconductor optical amplifier.

9. The structure of claim 4 wherein the light source is a semiconductor laser.

10. The structure of claim 9 wherein the semiconductor laser includes a light-emitting layer that has a tilt, and the waveguide core is tilted to match the tilt of the light-emitting layer.

11. The structure of claim 4 wherein the first sidewall of the first segment and the first sidewall of the second segment are configured to reflect the light in a direction that is non-aligned with the longitudinal axis.

12. The structure of claim 1 wherein the waveguide core includes a third segment adjacent to the second segment of the grating and a rib overlapped with the third segment.

13. The structure of claim 12 wherein the second sidewall of the second segment is positioned adjacent to the third segment.

14. The structure of claim 1 wherein the grating includes a third segment positioned between the first sidewall of the first segment and the first sidewall of the second segment, and the third segment includes at least one sidewall sloped at a third angle relative to the longitudinal axis.

15. The structure of claim 1 wherein the grating includes a third segment and a fourth segment positioned along the longitudinal axis in a second spaced-apart arrangement, the third segment has a first sidewall sloped at a third angle relative to the longitudinal axis and a second sidewall oriented transverse to the longitudinal axis, the fourth segment having a first sidewall sloped at a fourth angle relative to the longitudinal axis and a second sidewall oriented transverse to the longitudinal axis, and the first sidewall of the third segment is positioned adjacent to the first sidewall of the fourth segment.

16. The structure of claim 15 wherein the first angle is equal to the third angle, and the second angle is equal to the fourth angle.

17. The structure of claim 1 wherein the grating is terminated by the first segment.

18. The structure of claim 1 wherein the first angle is equal to the second angle.

19. The structure of claim 1 wherein the first sidewall of the first segment is aligned parallel to the first sidewall of the second segment.

20. A method comprising:
forming a waveguide core that has a longitudinal axis and a grating including a first segment and a second segment positioned along the longitudinal axis in a spaced-apart arrangement,
wherein the waveguide core is positioned on a substrate, the first segment has a first sidewall sloped at a first angle relative to the longitudinal axis and a second sidewall oriented transverse to the longitudinal axis, the second segment has a first sidewall sloped at a second angle relative to the longitudinal axis and a second sidewall oriented transverse to the longitudinal axis, and the first sidewall of the first segment is positioned adjacent to the first sidewall of the second segment.

* * * * *

UNITED STATES PATENT AND TRADEMARK OFFICE
CERTIFICATE OF CORRECTION

PATENT NO. : 12,339,495 B2  
APPLICATION NO. : 17/861345  
DATED : June 24, 2025  
INVENTOR(S) : Yusheng Bian Page 1 of 1

It is certified that error appears in the above-identified patent and that said Letters Patent is hereby corrected as shown below:

In the Claims

Column 7, Claim 2, Line 4 reads:
"a dielectric material disposed in that fills the gap."
It should read:
-- a dielectric material that fills the gap. --

Signed and Sealed this
Twenty-second Day of July, 2025

Coke Morgan Stewart
*Acting Director of the United States Patent and Trademark Office*